United States Patent [19]

Scott et al.

[11] Patent Number: 5,114,537

[45] Date of Patent: May 19, 1992

[54] DRY SHEET-LIKE FILTERING MATERIAL FOR LIQUID DEPTH FILTRATION

[75] Inventors: Robert S. Scott; Richard W. Atwood, both of Mill Valley, Calif.

[73] Assignee: BIO Associates, a California partnership, Petaluma, Calif.

[21] Appl. No.: 601,077

[22] Filed: Oct. 23, 1990

[51] Int. Cl.$^5$ ............................................. D21H 13/06
[52] U.S. Cl. .................................. 162/146; 162/157.6
[58] Field of Search ............................ 162/146, 157.6; 210/508

[56] References Cited

U.S. PATENT DOCUMENTS

| | | | |
|---|---|---|---|
| 2,887,429 | 5/1959 | Grieggs et al. | 162/146 |
| 3,007,840 | 11/1961 | Wilcox | 162/101 |
| 3,158,532 | 11/1964 | Pall et al. | 162/146 |
| 3,342,921 | 9/1967 | Brundige et al. | 264/200 |
| 3,396,061 | 8/1968 | Browne | 156/178 |
| 3,420,245 | 1/1969 | Kiefer | 131/261 |
| 3,573,158 | 3/1971 | Pall et al. | 162/146 |
| 3,842,007 | 10/1974 | Caputi, Jr. et al. | 210/65 |
| 3,961,007 | 6/1976 | Caputi, Jr. et al. | 264/140 |
| 4,007,113 | 7/1975 | Ostreicher, Jr. et al. | 210/23 R |
| 4,007,114 | 7/1975 | Ostreicher, Jr. et al. | 210/23 R |
| 4,040,856 | 8/1977 | Litzinger | 162/146 |
| 4,047,862 | 9/1977 | Keith | 425/8 |
| 4,192,838 | 3/1980 | Keith | 264/10 |
| 4,274,914 | 6/1981 | Keith | 162/109 |
| 4,293,378 | 1/1980 | Klein | 162/145 |
| 4,460,647 | 7/1984 | Keith | 428/369 |

FOREIGN PATENT DOCUMENTS

| | | |
|---|---|---|
| 2354060 | 1/1978 | France . |
| 75181974 | 1/1974 | Japan . |
| 50-33166 | 10/1975 | Japan ................................ 162/146 |

OTHER PUBLICATIONS

Smith, Jeanne E., "Fibrets: A Highly Fibrillated Form of Cellulose Acetate for Specialty Industrial Applications", *Nonwovens World* (Nov./Dec. 88); *Impact Conference* (Mar. 88).

Hoechst Celanese News Release, May 11, 1988, entitled "Special to Nonwovens Industry".

Smith, Jeanne E., "Fibrets Entrap and Entangle to Improve Specialty Industrial Applications", *Nonwovens World* (Nov. 88).

Smith, Jeanne E., "Cellulose Acetate Fibrets: A Fibrillated, High Surface Area Pulp for Specialty Industrial Applications", Presentation for 1988 TAPPI NonWovens Conference.

Product Sheet, "Hoechst Celanese Fibrets Highly Fibrillated Microfibers" (Feb. 1990).

Smith, Jeanne E., "Cellulose Acetate Fibrets: A Useful Tool for Specialty Industrial Applications", *World Pulp and Paper Technology*, 1990.

*Primary Examiner*—Peter Chin
*Attorney, Agent, or Firm*—Kathleen A. Skinner

[57] ABSTRACT

A dry sheet-like filtering material for use in liquid depth filtration and a method for making the filtering material are disclosed. The filtering material is prepared from cellulose ester fibrils having a surface area of at least 5 square meters per gram and cellulose fibers which have been beaten. The degree of beating to which the cellulose fibers are subjected and the amount of cellulose acetate fibrils mixed with the cellulose fibers can be controlled to affect the retention and flow rate characteristics of the filtering material. The filtering material is produced by preparing slurries of the cellulose ester fibrils and the cellulose fibers, beating at least the cellulose fibers, mixing the slurries, depositing the mixed slurry on a porous surface which permits the drainage of water from the deposited fibrous structure, removing the water whereby the fibrous structure is formed into a filter sheet, and drying and cutting the filter sheet.

22 Claims, 4 Drawing Sheets

DRY SHEET-LIKE FILTERING MATERIAL FOR LIQUID DEPTH FILTRATION

BACKGROUND OF THE INVENTION

1. Field of the Invention

The present invention relates to the field of liquid depth filtration and, more particularly, to dry filter sheets for the filtration of very small particles.

2. Description of the Related Art

Many liquids are filtered to achieve clarity and purity of the final product. For example, water and such products as wine, beer, distilled spirits, fruit juices, pharmaceuticals, cosmetics, etc., are desirably filtered to remove very small particulates which cause clouding or sediment and which might go back into solution. If allowed to remain in the liquid, particulate matter which is biological in nature such as yeast, bacteria, and viruses, may change the liquid into an undesirable product by continued fermentation or other processes, thus reducing shelf life.

Liquid depth filtration has long been used to remove solids by forcing the liquid through a porous medium. Early filtering media included sand beds, cloth, and paper. Early in this century it was found that filter sheets made from asbestos and cellulose pulp were excellent filter media. Asbestos, which is a naturally occurring mineral, could be fibrillated to very small diameters and blended with fibers of larger diameter, such as wood pulp and/or cotton. This blend could be formed into a sheet of considerable thickness having very small inner spaces and interlocked layers. Commercial asbestos-cellulose sheets were usually 2.0 to 6.0 mm. thick; most sheets were standardized to a thickness in the 3.5–4.0 mm. range. The tortuous path between the openings provided capillaries of predictable average size and, therefore, predictable random entrapment of the solids to be removed. By varying the percentage of asbestos, the degree of fibrulization of the asbestos and the type of the cellulose, filter sheets could be produced with varying degrees of porosity. They could be as tight as 0.2 micron, which is approximately the tightness necessary for removal of all microorganisms.

These asbestos-cellulose sheets were dried and cut to an appropriate size for use on filter presses or cut into discs which could be fabricated into cartridges for insertion into cartridge housings. Because of the low cost of the components, these dry filter sheets of asbestos/cellulose were relatively inexpensive. They could be economically stored, transported and disposed of after use. As a result, until the 1970,s, these filter sheets of asbestos and cellulose were widely used throughout the world for presses and preformed cartridges. There are tens of thousands of presses and cartridge housings, which were built to hold such filter sheets and such cartridges, still in use.

For rough filtration or large volume filtration, loose media such as diatomaceous earth (skeletons of prehistoric diatoms) and/or perlite (a ground volcanic glass), have been used as depth filter media in pressure leaf filters. Often cellulose, asbestos or other fibers have been combined with such loose media or used as precoating materials to prevent migration of the filter aid particulates through the filter screen support.

For fine or ultimate filtration, porous membranes have also been used commercially. Although such membranes provide predictable, absolute screens against the passage of very small particles, they have very little solids holding capacity and tend to clog rapidly when challenged with any quantity of solids. Membranes are useful filter media for a final filtration step of a liquid from which the bulk of the solids has been removed by other processes but membranes are not efficient general filtration media.

Although its filtration abilities were excellent, asbestos became an undesirable filter medium. Various types of asbestos had been used over the years for many other purposes, ranging from brake linings to thermal insulation. In order to prevent fire at sea, which is a major danger to ships, asbestos insulation was used extensively in hundreds of ships built in the first half of the twentieth century. By the early 1970's the medical literature started reporting that shipyard workers were subject to various diseases which seemed related to contact with asbestos. More recently, other insulation workers who worked with asbestos have been reported as having similar health problems. The use or handling of asbestos in any form came to be considered dangerous. Asbestos became unacceptable to the general public.

Microfiberglass has been used as a substitute for asbestos in certain filter applications. However, the National Institute of Health has reported that a major cause of the health hazard of asbestos is related to the size and the nondegradable nature of the fibers and it is believed that microfiberglass could present a health hazard similar to that of asbestos.

As a result, there have been extensive efforts to develop a line of asbestos-free (and microfiberglass-free) filter sheets since the early 1970's. Both perlite and diatomaceous earth have been tried as substitutes for asbestos in the composition of filter sheets and they have now become widely used in combination with cellulose fibers in the fabrication of filter sheets.

Several drawbacks to filter sheets made with either diatomaceous earth or perlite have been noted. First, since these materials are particulate rather than fibrous they are incapable of bridging the space between cellulose fibers and cannot be interlocked into place as reliably as fibers can. In order to provide filtration sufficiently tight to retain small microbiological organisms, the media particles must be very small. Since these small particles are not firmly locked in place, they tend to migrate into the filtrate, contaminating the final product. This problem of media migration is increased whenever the relatively stiff, particulate-containing filter sheets are bent or scuffed. Even with the use of wet and dry strength resin binders, and even when the cellulose fibers are beaten to increase their holding capability, there can be no absolute guarantee against particles flowing to the filtrate.

Secondly, diatomaceous earth and perlite contain crystalline silicates. Crystalline silicates have been determined by the IARC Committee of the World Health Organization to be potential carcinogens. U.S. regulations require a health warning label on these crystalline silicate products. It is feared that the dangers of asbestos, or perceived dangers of asbestos, regarding problems of production, use and disposal could be applicable to diatomaceous earth and perlite, as well.

Finally, diatomaceous earth (and to a lesser extent, perlite), contain iron, aluminum and other metallic ions which can be leached into the filtrate. As little as 6 parts per million ferrous ion in beer can be detected by a trained taster; iron can also turn whiskey black and catalyze a protein-tannin precipitation in wine and alcohol-based cosmetics and drugs. Traces of copper can cause "a casse" (a cloud) in wine. In the pharmaceutical industry, filtration processes are believed to allow aluminum pick up in injectable drugs. Since reports in the medical literature connect aluminum uptake to certain diseases, metallic ion leaching is particularly undesirable in these circumstances.

The shortcomings of microfiberglass, diatomaceous earth and perlite as asbestos substitutes have made the search for an effective filtering medium without similar health risks more important. One such promising substitute has been cellulose esters made in fine fibrous form. The preparation and use of cellulose acetate filter material has been described in U.S. Pat. Nos. 3,842,007 and 3,961,007. Both these patents discuss the storage and use in a wet state of high surface area cellulose acetate, described as "rod-shaped fibers intermingled with fine fluffy filaments and having a surface area in the range of about 35 $m^2/g$ and about 55 $m^2/g$". Such material was apparently intended for use in pressure leaf filters, which utilize filter beds formed in situ, at the point of use. U.S. Pat. No. 3,842,007 specifically noted that fluffy cellulose acetate could not be dried without destroying its usefulness as a filter material. Although U.S. Pat. No. 3,961,007 mentioned that cellulose acetate fibers could be advantageously mixed with other filter materials, such as cellulose fibers, the patent teaches that such other materials are to be added to the cellulose acetate solution prior to precipitation of the cellulose, acetate fibers. Further, such mixtures were to be 0.5:1 (33⅓%) to 3:1 (75%) cellulose acetate: cellulose. The assumption that such a filtering material would be expensive is reinforced by the description in the patent of possible collection, washing and reuse of the material. No mention of forming preformed dry depth filter sheets is contained in these patents.

Other patents disclose other methods for making high surface area cellulose ester fibrils. U.S. Pat. No. 4,047,862 describes a method for making such material for an end use "as fillers in high opacity paper with high retention during the paper making process." U.S. Pat. Nos. 4,192,838 and 4,274,914 disclose yet another method for formation of the fibrils which were called "fibrets." "The term 'fibret' as employed herein identifies a high surface area, cellulose ester fibrillar material having a surface area in excess of 5.0 square meters per gram, lengths of less than 1,000 microns and diameters of about 0.5 to 50 microns." In each of these latter patents the material was described for use as a component in a very thin sheet-like material suitable for corrugating and use in the smoke filter of cigarettes, a product used in dry form which is 1/500 the thickness of a liquid depth filter sheet. Thus, cellulose ester fibrils, despite their reported capability since the mid-1970's as a filtration medium, have not been used in making a dry filter sheet which can be usable in a standard filter press or filter cartridge for liquid depth filtration. Cellulose ester material, which is relatively expensive compared to other filtration media, was not considered usable, in the quantities taught in the art, for disposable dry filter sheets.

Thus, since the 1970's, there has been a need for a filtering material which would be effective for filtering liquids to remove particles in the range of 0.2 to 30 microns and which would not be a potential health hazard at either the point of manufacture, the point of use, o the point of disposal. There has been a need for such an effective filtering material which could be made economically enough to be disposable. There has been a special need in the field for a filtering material which can be formed into dry filter sheets which can be cut to fit into the numerous existing filter presses and cartridge housings originally developed to use asbestos/cellulose or diatomaceous earth/cellulose filter sheets.

The present invention is a solution to these problems and provides a new sheet-like filtering material made only from biodegradable materials which have been "generally regarded as safe" by the U.S. Food & Drug Administration. This invention uses cellulose which, after it has been beaten, can be combined with relatively minor quantities of cellulose ester fibrils to form dry filter sheets which have effective filtering capabilities for fine filtration comparable to asbestos/cellulose filters but without the health hazards of the latter. The filtering material of this invention can be made into preformed filters and discs for cartridges to fit the existing filtration equipment and at an economic cost so that such sheets can be disposable. Leaching of particulates and health hazards are avoided with this invention.

SUMMARY OF THE INVENTION

This invention is a dry sheet-like filtering material for use in liquid depth filtration which is made from cellulose ester fibrils having a surface area of at least 5 square meters per gram and cellulose fibers, which preferably have been beaten sufficiently to fray or abrade at least some portions of the fibers. The preferred composition of the dry filter sheet is from about 2% to about 30% cellulose ester fibrils and from about 98% to about 70% cellulose fibers in the form of wood pulp. A cationic wet strength resin binder may also be used for additional sheet strength. The invention also includes a method for making this dry depth filter sheet which includes the steps of preparing slurries in water of cellulose fibers and cellulose ester fibrils, beating at least the slurry of cellulose fibers to fray the fibers, homogeneously mixing these slurries, depositing the mixed slurry on a porous surface to permit the drainage of water from the deposited fibrous structure, removing water from the fibrous structure to form it into a filter sheet, drying the sheet and then cutting the sheet into a desired size and shape.

The cellulose fibers are preferably beaten, separately or after mixing with the cellulose ester fibrils, until the fibers have a multiplicity of frayed portions. By varying the intensity and duration of the beating of the cellulose fibers and by varying the relative proportion of cellulose fibers to cellulose ester fibrils, filter sheets can be prepared within a range of porosities and flow rates to retain particles in the size range of 0.2 micron to 30 microns. These filter sheets substitute in efficacy and operation for asbestos/cellulose filter sheets, without the use of fiberglass, diatomaceous earth, perlite or asbestos. These filter sheets can be slit, sheared or die cut into sizes to fit depth filter presses and cartridge housings of the type currently in use throughout the world. They are completely biodegradable and they are also economically feasible because the treatment of the cellulose fibers makes it possible to obtain a desirable filter sheet with only a minor amount of the relatively expensive cellulose ester fibrils.

Other advantages of the invention will become apparent when considered in conjunction with the accompanying drawings describe hereafter.

DESCRIPTION OF THE DRAWINGS

FIG. 1 is a graph of comparative flow rates of filter sheets made from 100% cellulose fibers (A) relative to time of beating of the fibers. Also plotted are flow rates of filter sheets made from combinations of cellulose fibers beaten for different lengths of time which have combined with varying amounts of cellulose ester fibrils (B, C, D, and E) and also filter sheets made from cellulose ester fibrils only (F).

DESCRIPTION OF THE PREFERRED EMBODIMENTS

The present invention is a dry sheet-like filtering material which can be easily cut into filter sheets of a desired size for use in liquid depth filtration. It comprises cellulose ester fibrils having a surface area of at least five (5) square meters per gram and cellulose fibers The cellulose ester fibrils used in the invention may be obtained from Hoechst Celanese Corp., Charlotte, N.C. under the name "fibrets" and are believed to have been manufactured as described in U.S. Pat. Nos. 4,047,862; 4,192,838; and 4,274,914. While cellulose acetate fibers are discussed in U.S. Pat. Nos. 3,842,07 and 3,961,007, the fibers described therein have a substantially larger surface area (in the range of 35-55 square meters per gram) than the fibrets preferred herein. These fibrets are cellulose ester fibrillar material having surface areas in excess of 5.0 square meters per gram, lengths of less than 1000 microns and diameters of from about 0.5 to about 50 microns. It is believed, based on information received from the fibrets manufacturer, that the fibrets used in the examples reported below have a surface area of 20 $m^2/g$, a length of 20-200 microns and a diameter of 0.5 to 5 microns. These fibrets are preferably cellulose acetate fibrils, which are available commercially in a damp form.

Only a minor quantity of the cellulose ester fibrils are needed, relative to the amount of cellulose fibers used. A suitable filter sheet within the range of porosity, sheet strength and flow rates desired for a variety of uses in the liquid depth filtration of fine particles can be prepared with from about 2% to about 30%, and preferably from about 5% to about 10%, cellulose ester fibrils on a dry weight basis to the total fibrous composition. A remarkable feature of this invention is that this filter sheet is efficacious for liquid depth filtration with such a small quantity of the relatively expensive cellulose ester fibrets.

The dry sheet-like filtering material of the invention contains cellulose fibers as its predominant component. These fibers can be selected from the group of soft wood pulp, hard wood pulp, cotton fibers (such as linters), esparto fibers and mixtures of any of these. The preferred cellulose fiber is softwood pulp, however, such as the bleached softwood sulfite wood pulp obtained from Tembec, Inc., 800 Dorchester Blvd., Montreal, Quebec, Canada. The dimensions of the cellulose fibers prior to beating are not critical. The cellulose fibers comprise from about 98% to about 70%, and preferably from about 95% to about 90%, on a dry weight basis of the composition of the filter material. The cellulose fibers used herein are beaten sufficiently to fray at least some portion of the fibers. The beating action referred to may include any equivalent method of working or abrading the cellulose fibers. They may be beaten by a commercial beating machine, such as a Claflin beater or other standard paper industry beating machine, or in the laboratory, by a high shear blender. The examples reported herein were accomplished using an Osterizer laboratory high shear blender. Time of beating was found to compare in an almost straight line relationship to the ampere draw at a constant flow rate on a Claflin Model 01 beater, from Bolton Emerson Co., Lawrence, Mass. Similar relationships can be expected from the use of larger Claflin beaters or similar equipment. This working of the cellulose fibers is believed to form short-cropped fibers with torn and frayed ends and a multiplicity of tendrils or "whiskers" on the torn sides. It has been found that simple mixing of cellulose with cellulose ester fibrils did not form a filtering sheet with the desirable retention/flow rate characteristics unless the quantity of cellulose ester fibrils used was so large as to be economically undesirable. Moreover, filtering sheets formed from the simple mixture of cellulose and cellulose ester fibrils produced erratic results in terms of filtration characteristics.

A cationic wet-strength resin binder, such as melamine formaldehyde, acrylic acid-acrylimide, polyamide-epichlorohydrin, or any of the other available paper-making resin binders which have been used in the production of asbestos-cellulose or D.E.-cellulose filter sheets, may be added to the composition of the filter sheet for additional sheet strength. Typically, a 6% aqueous solution of the resin is first made. This dilute solution is then added to the slurry mixture of cellulose ester fibrils and beaten cellulose fibers at a range between 1.25 ml. and 12.5 ml. resin solution per liter of slurry. The preferred range is 1.5 to 3.0 ml. resin per liter of slurry. The use of such resins is discussed in U.S. Pat. No. 2,559,220. Parez 607 or Parez 631 from American Cyanamide Co., Wayne, N.J., have been used satisfactorily in this method and product. Other wet strength resins can also be used in this invention.

Figure 3:
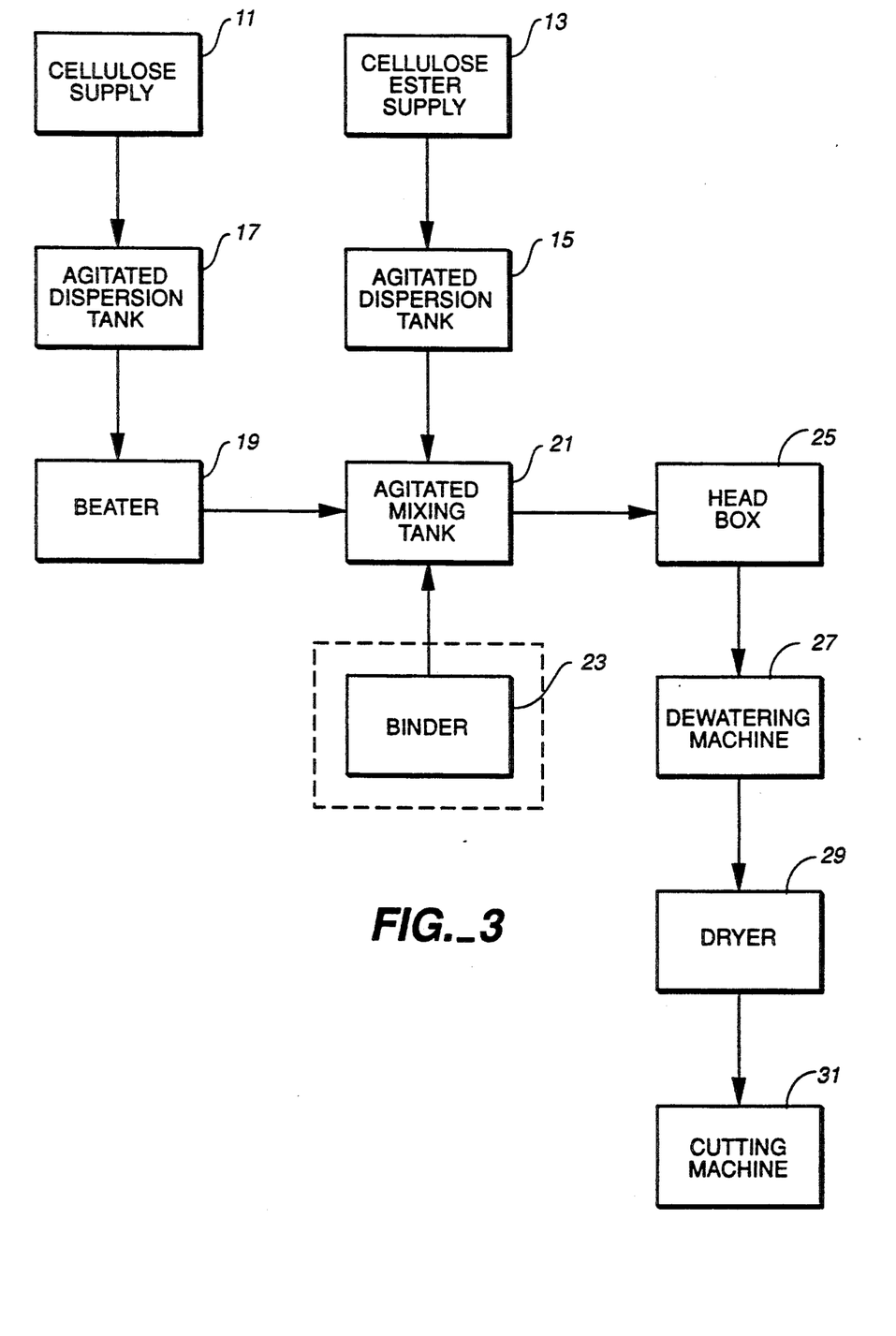
FIG. 3 is a flow diagram of the preferred process for the preparation of the dry sheet-like filtering material of this invention.
Figure 4:
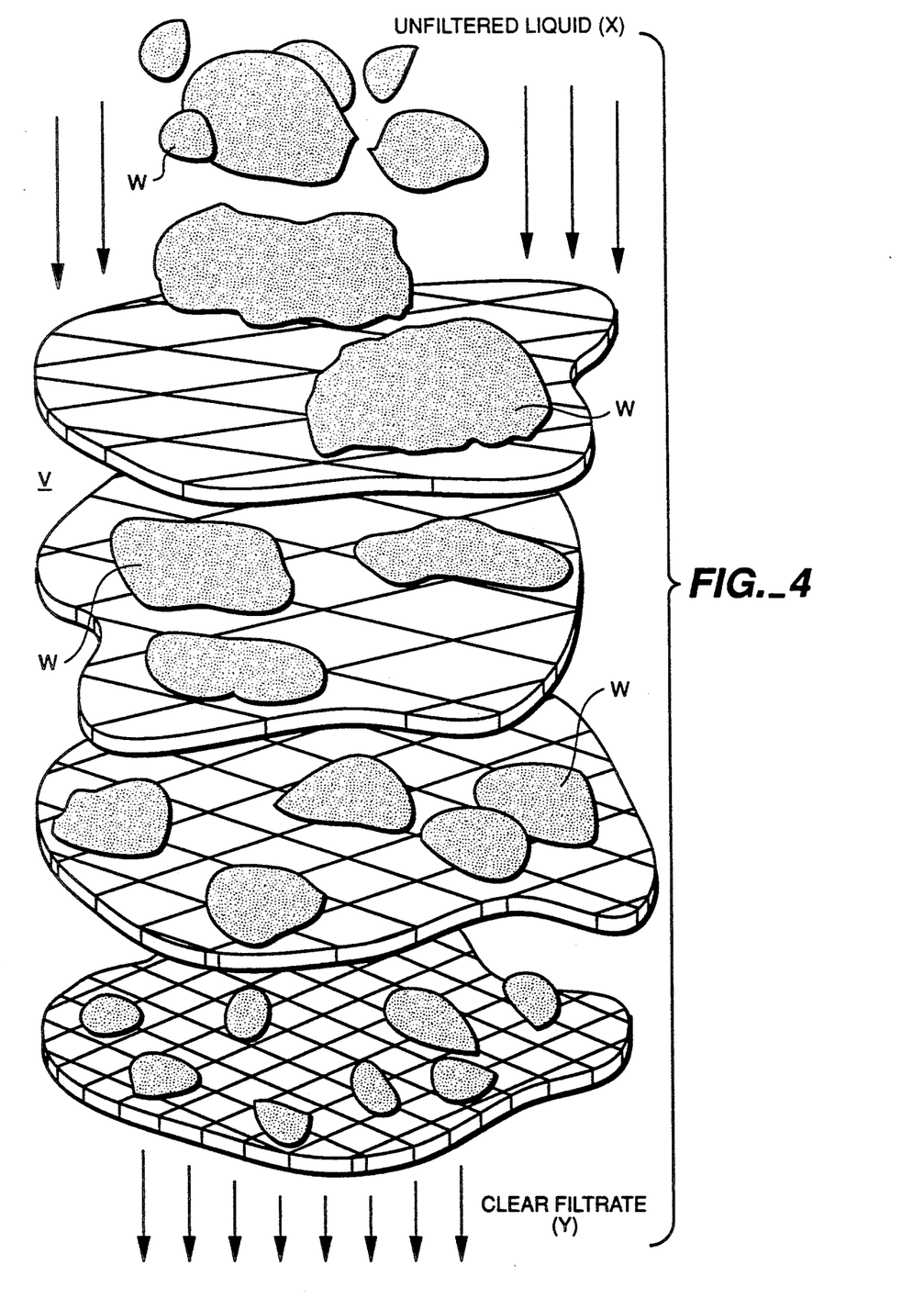
FIG. 4 is a schematic diagram of a webbed lattice structure of a typical prior art depth filter sheet V showing retention of particles W from an unfiltered liquid X throughout the depth of the filter sheet, and clear Filtrate Y.

Referring to the flow sheet shown in FIG. 3, the dry filter sheet-like material of this invention is produced by first preparing slurries of the cellulose fibers 11 and the cellulose ester fibrils 13 in water. The selected weight of the cellulose ester fibrils can be added to a dispersion tank 15 and agitated until suitably mixed. Similarly, a selected amount of the cellulose fibers will be added to a tank 17, and mixed with water. Each of these slurries can be prepared separately or the components can be mixed at the time of preparing the slurries. In any case, each slurry is approximately 1% to 3.5% solids, with 1.5% to 2.5% solids being the preferred consistency. The slurry of cellulose fibers is then added to a beater 19 and beaten, as described above. While the slurry of cellulose ester fibrils may be mixed with the cellulose slurry before beating and the components may be cobeat, there seems to be no advantage to beating the cellulose ester fibrils, provided they have been properly dispersed in the slurry. The beating of the cellulose fibers is important, however. The intensity of the beating action, the relative proportions of cellulose fibers to cellulose ester fibrils used and the range of flow rate/retention characteristics desired for a particular purpose, will determine the duration of the beating.

The minimum amount of beating of the slurry of cellulose fibers preferred for this invention will reduce the "freeness" (flow rate) of the cellulose fiber component by 10%. The result of beating can be rapidly determined by measuring the change in flow rate of a filtering sheet prepared from the cellulose fibers alone. A pad 3.5 mm. thick is formed from a well-dispersed but unbeaten slurry of the selected cellulose This pad should be thoroughly dried. It is then fitted to a standard laboratory sheet filter holder, such as a Seitz, Ertel, Millipore or other filter holder, rewetted and checked as to flow rate with distilled water. The resulting flow rate is the standard flow rate for the cellulose used, $S_{STD}$. In like fashion, a sample of the same pulp, after beating, is formed to a similar pad, dried, fitted to the holder, rewet and tested. The result is $S_B$. The preferred minimum beating will yield $$\frac{S_B}{S_{STD}} = .90.$$

In Example 1 set forth below, the unbeaten Tembec softwood sulfite pulp had a standard flow rate of $S_{STD} = 1260$ hl/m²/hr. The minimum preferred beating would reduce this flow rate to $S_B = 0.90(S_{STD}) = 1134$ hl/m²/hr. It should be noted that the intensity of the beating can be increased to reduce the flow rate $S_B$ to lower than 0.90 $S_{STD}$.

The beaten cellulose fiber slurry and the cellulose ester fibril slurry are then mixed in an agitated mixing tank 21. The slurries should be mixed until homogeneous. This can be accomplished with a propeller agitator or by pumping through a jet mixer. As mentioned previously, the slurries could be similarly mixed prior to the beating of the cellulose fibers, so that it is the mixture which is beaten. Wet-strength resin, in a solution as described above, may optionally be added to this mixing tank as a binder 23.

The mixed slurry is deposited on a porous surface which permits the drainage of water from such slurry through the fibrous material. Preferably such drainage will be vacuum assisted. Normally this process would be accomplished by pumping the slurry into a head box 25 from which it would be laid down on an advancing, porous dewatering belt 27 such as a Fourdrinier, a high vacuum dewatering belt or similar machine. For small scale operations, false bottomed, vacuum assisted, dewatering trays can also be used. The sheet which is formed is a dense thick web 2.0 to 6.0 mm. thick which can then be dried in a normal manner. Preferably, a high velocity, hot air drier 29 is used but radiant heat may be used provided the sheet is not scorched. The filter sheet can thereafter be cut by a cutting machine 31 to fit standard filter presses or it can be die cut to be formed into cartridges for use in typical cartridge housings.

This invention is further illustrated by, but not restricted to, the following examples:

EXAMPLE 1

20g. of bleached softwood sulfite pulp obtained from Tembec Inc., Quebec, Canada, was cut into small pieces and added to 980 ml. of tap water at ambient temperature in a 1 liter beaker. This was stirred for 25 minutes with a laboratory propeller agitator until the fibers were uniformly dispersed and the slurry smooth. All of this slurry was poured through Wattman #4 filter paper fitted into a 165 mm. diameter Buchner funnel and dewatered to form a filter sheet 3.5 mm. thick. The filter sheet was oven-dried, cut and fitted into a 47 mm. Seitz laboratory filter cup. After the filter sheet was thoroughly rewetted, the flow rate of the sheet was determined with distilled water, using a vacuum of 500 mm. Hg. and approximately 30 mm. head. Additional slurries of 100% cellulose were also prepared by this method. These slurries of 100% cellulose were beaten in an Osterizer high shear mixer for 5, 10, 15 and 20 minutes, respectively.

In similar fashion the slurries described above were mixed with slurries of cellulose acetate fibrets so as to give mixtures with 5%, 10%, 15% and 20% fibrets, dry weight basis, based on the total weight of fibrous material, for each degree of beating. Finally, a slurry of 100% cellulose acetate fibrets was prepared, samples of which were beaten for similar times.

Filter sheets of 3.5 mm. thickness were formed from each of these samples using the method described above, dried and checked for flow rate, as above described.

Flow rates for each of these test sheets are shown in FIG. 1. The X coordinate shows the minutes of beating to which each slurry of cellulose fibers had been subjected before being mixed with the cellulose ester fibrils. It will be noted that the flow rate through the filter sheets prepared from each mixture varies inversely with the duration of the beating to which the cellulose fibers had been subjected. The duration of the beating of the cellulose fibers correlates directly with the degree to which the cellulose fibers had been beaten. The Y coordinate shows the flow rate of distilled water (measured as described above) through filter sheets prepared from: (A) 100% cellulose fibers alone; and from different mixtures of components: (B) 95% cellulose/5% cellulose ester fibers ("fibrets"); (C) 90% cellulose/10% fibrets; (D) 85% cellulose/15% fibrets; (E) 80% cellulose/20% fibrets; and from: (F) 100% fibrets. It can be seen that there is an inverse relationship between the flow rate and the amount of cellulose ester fibrets in the filter sheet. From FIG. 1, one can see that the flow rate of a filter sheet can be reduced by beating the cellulose fibers for an increased time and/or by increasing the proportion of cellulose ester fibrils in the composition of the filter sheet.

EXAMPLE 2

The contaminant retention capabilities of the invention were tested by comparing the degree of penetration of particles 1 to 3 microns in size through different filter sheets of the same composition, but in which the cellulose fiber component had been beaten for varying times. All sheets contained 15% cellulose acetate fibrets and 85% cellulose fibers (Preparation D from Example 1). Filter sheets prepared from 100% cellulose fibers (Preparation A from Example 1) which had been beaten for varying times, were also tested. The degree of penetration is the reciprocal of retention capability.

A "rapid" test suspension was prepared by forming an aqueous suspension of Prussian blue particles and verifying the particle size as passing through a membrane of known 3 micron maximum pore size and being retained on a membrane of known 1 micron size.

Figure 2:
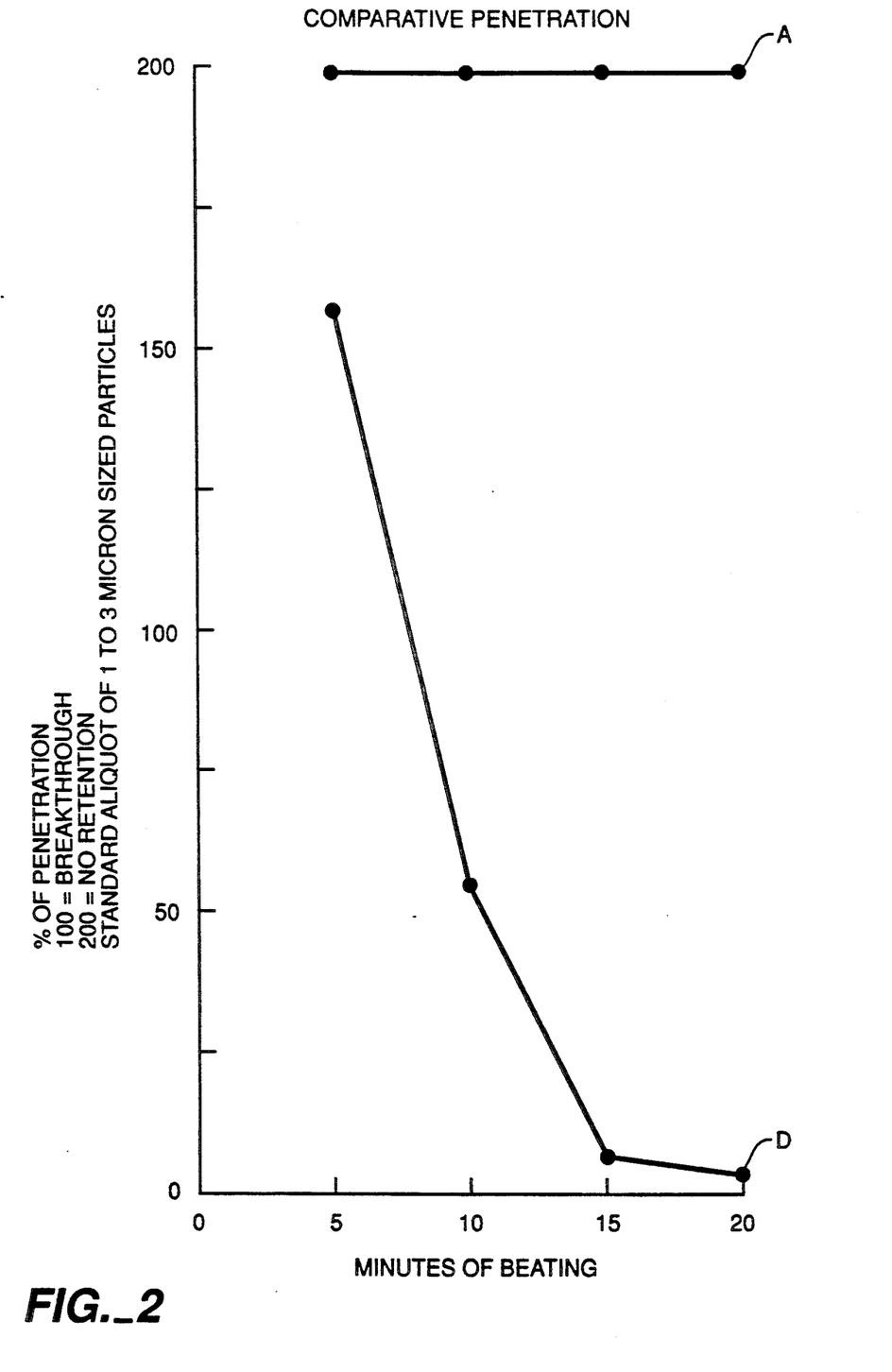
FIG. 2 is a graph of comparative penetration of particles of 1 to 3 microns in size through the thickness of a filter sheet made from 100% cellulose fibers (A) and of one embodiment of this invention (D) relative to the length of time (in minutes) that the cellulose fibers had been beaten. The particular sheets being tested were comprised of 85% cellulose fibers and 15% cellulose acetate fibrets.

Filter sheets were formed as described in Example 1, from a slurry of 100% cellulose beaten 5, 10, 15 and 20 minutes (A) and from slurries of 85% cellulose fibers, beaten 5, 10, 15 and 20 minutes, respectively, mixed with 15% cellulose acetate fibrets (D). Each sheet was rewetted and challenged with an aliquot of the test suspension of Prussian blue particles ranging in size from 1 micron to 3 microns with the sheet under 500 mm. Hg of vacuum. The degree of penetration through the thickness of each filter sheet was observed and is shown in FIG. 2. The X coordinate again shows the duration of beating to which the cellulose fibers had been subjected. The Y coordinate shows the percentage of penetration of blue particles through the depth of each filter sheet. Number less than 100% indicate the percent of sheet thickness through which the particles penetrated (that is, 10% indicates that the blue particles penetrated through only 10% of the total thickness of the sheet). The breakthrough of pinpoints of blue on the filtrate side of the sheet was considered 100% penetration; 200% penetration represented little or no retention capabilities; for 200%, the entire downstream surface of the filter sheet and the filtrate were blue, showing little or no retention of this size particles. Thus, the higher the penetration percentage, the lower the retention ability of the filter sheets.

It is noted that the increase in beating of the cellulose, while it reduced flow rate as seen in Exhibit 1, did not increase the retention capabilities of the sheet for particles in this size range. However, the amount of beating of the cellulose fibers had a remarkable effect on the retention ability of the sheets which had been formed from the combination of cellulose fibers which had been beaten and cellulose acetate fibrets. The addition of cellulose ester fibrils to beaten cellulose fibers causes far greater retention capability than the addition of the same amount of cellulose ester fibrils to unbeaten cellulose fibers.

EXAMPLE 3

Slurries were prepared as described in Examples 1 and 2 from 5% cellulose acetate fibrets/95% cellulose fibers and 10% cellulose acetate fibrets/90% cellulose fibers in which the cellulose component had been beaten for varying amounts of time up to 20 minutes. The procedures described in Example 2 were used to measure the penetration of particles through each filter sheet. Comparable differences in retention capabilities similar to those shown in FIG. 2 were observed with these mixtures.

EXAMPLE 4

Filter sheets were formed from slurries made from 90% cellulose fibers beaten for 3, 7¼, and 12¼ minutes and mixed with 10% cellulose acetate fibrets and 3ml./liter of 6% Parez 607 wet strength resin. These sheets were challenged with an aqueous suspension of Prussian blue particles sized 0.2 micron to 0.45 micron. (Particle size was tested with known size membranes as described in Example 2.) As will be seen from the following table, the penetration of the smaller particles is greater than the penetration of the larger particles described in Example 2 but the degree of penetration remains related to the amount of beating.

TABLE 1

| Minutes of Beating of Cellulose Fibers | 3 | 7¼ | 12¼ |
|---|---|---|---|
| Penetration of Particles 0.2 to 0.45 microns | 200% | 50% | 20% |

It has been learned that increasing the beating time of the cellulose fibers can reduce the proportion of cellulose ester fibrils necessary to obtain a liquid depth filter sheet having good retention capability and flow rate characteristics and that the two factors, (1) beating of the cellulose and (2) percentage of cellulose ester fibrils, can be varied to achieve filter sheets with the desired filtration qualities at the lowest cost.

The rapid tests described in these examples have been used for many years as a convenient method to test the relative differences between filter sheets. Efficiency of the filter sheets can also be measured by using bacteria of known size or commercially available latex test contaminants of known particle size and measuring the turbidity of the filter effluent, as known in the art (e.g., Section 214 *Standard Methods for the Examination of Water and Wastewater,* 17th edition, 1989, American Public Health Association).

From the teachings of this invention, it is seen that it is possible to form depth filter sheets for liquids suitable for removal of the entire range of particulate matter from 0.2 micron to 30 micron size. These filter sheets will have the following advantages:

(a) They can be formed to economically provide filter sheets to cover the range of retention capabilities, heretofore provided by asbestos/cellulose filter sheets.

(b) They can be shipped, stored and handled in the dry form.

(c) They can be cut to size and shape to fit any of the thousands of filter presses or cartridge size requirements throughout the world.

(d) They are free from leachable metallic ions.

(e) They are entirely fibrous and present no known possibility for media migration.

(f) They are composed entirely of components considered safe and no component of which requires a health warning label.

(g) They are completely biodegradable.

Modifications of the above described invention which are obvious to those of ordinary skill in the filtration industry are intended to be within the scope of the following claims.

We claim:

1. A dry liquid depth filter sheet having a thickness of at least about 2 mm comprising from about 2% to about 30% cellulose ester fibrils having a surface area of at least 5 square meters per gram and from about 98% to about 70% cellulose fibers, said cellulose fibers having been beaten.

2. The dry liquid depth filter sheet of claim 1 wherein the cellulose ester fibrils comprise cellulose acetate fibrils.

3. The dry liquid depth filter sheet of claim 1 wherein the cellulose fibers are selected from the group of soft wood pulp, hard wood pulp, cotton fibers, esparto fibrils and mixtures thereof.

4. The dry liquid depth filter sheet of claim 1 wherein the cellulose ester fibrils comprise from about 5% to about 20% and the cellulose fibers are softwood pulp and comprise from about 95% to about 80% of said filter sheet.

5. The dry liquid depth filter sheet of claim 1 further comprising a cationic wet strength resin.

6. The dry liquid depth filter sheet of claim 1 wherein the cellulose fibers have been beaten sufficiently to cause a reduction of at least 10% in the flow rate of distilled water through a sheet 3.5 mm. thick formed solely from the beaten cellulose fibers as compared to the flow rate of a similar sheet formed from said cellulose fibers prior to beating, wherein each of said sheets has been formed, dried and rewetted before said flow rate is measured.

7. A dry liquid depth filter sheet having a thickness between 2 mm. and 6 mm. and having liquid depth filtration property for the removal of materials in the range of 0.2 microns to 30 microns in size, comprising from about 2% to about 30% cellulose ester fibrils having a surface area of at least 5 square meters per gram and from about 98% to about 70% cellulose fibers, said cellulose fibers having been beaten.

8. The dry filter sheet of claim 7 wherein the cellulose ester fibrils are cellulose acetate fibrils having lengths less than 1000 microns and diameters from about 0.5 microns to about 50 microns and the cellulose fibers are soft wood pulp.

9. The dry filter sheet of claim 7 further comprising a cationic wet-strength resin.

10. The dry filter sheet of claim 8 wherein the cellulose acetate fibrils having a surface area between 5 $m^2/g$ and 30 $m^2/g$ and comprise from about 2% to about 30% and the cellulose fibers comprise from about 98% to about 70% of said filter sheet.

11. The dry filter sheet of claim 10 wherein the cellulose acetate fibrils comprise from about 5% to about 20% and the cellulose fibers comprise from about 95% to about 80% of said filter sheet.

12. A method of producing a dry depth filter sheet at least about 2 mm thick for use in filtering liquids, which comprises
(a) preparing a slurry of cellulose fibers in water;
(b) preparing a slurry of cellulose ester fibrils having a surface area of at least 5 square meters per gram in water;
(c) beating the slurry of cellulose fibers;
(d) homogeneously mixing the slurries of cellulose ester fibrils and cellulose fibers;
(e) depositing the mixed slurry on a porous surface which permits the drainage of water from the deposited fibrous structure;
(f) removing the water from the fibrous structure whereby the fibrous structure is formed into a filter sheet;
(g) drying said filter sheet;
(h) cutting said sheet into a desired size wherein said filter sheet comprises at least about 70% cellulose fibers and at least about 2% cellulose ester fibrils.

13. The method of claim 12 wherein the slurry of cellulose fibers is beaten at least until the flow rate of distilled water through a sheet 3.5 mm. thick formed from the beaten slurry of cellulose fibers is no greater than 90% of the flow rate of a similar sheet formed from said slurry of cellulose fibers prior to beating, wherein each of said sheets has been formed, dried and rewetted before said flow rate is measured.

14. The method of claim 12 wherein the cellulose ester fibrils in said slurry comprise from about 2% to about 30% of the filter sheet and the cellulose fibers comprise from about 98% to about 70% thereof.

15. The method of claim 12 wherein the cellulose ester fibrils in said slurry comprise from about 5% to about 20% of the filter sheet and the cellulose fibers comprise from about 95% to 80% thereof.

16. The method of claim 12 further comprising the steps of ($d_1$) preparing a dilute solution of a cationic wet strength resin in water and ($d_2$) mixing said solution with the mixed slurry of cellulose ester fibrils and cellulose fibers.

17. The method of claim 14 wherein the cellulose ester fibrils comprise cellulose acetate fibrils.

18. The method of claim 12 wherein the dry depth filter sheet has a thickness between 2 mm. and 6 mm.

19. A method of producing a dry depth filter sheet having a thickness of 2 mm. to 6 mm. for use in filtering liquids, which comprises
(a) preparing a slurry of cellulose fibers in water;
(b) preparing a slurry of cellulose ester fibrils having a surface area of at least 5 square meters per gram in water;
(c) homogeneously mixing and cobeating the slurries of cellulose ester fibrils and cellulose fibers;
(d) depositing the mixed slurry on a porous surface which permits the drainage of water from the deposited fibrous structure;
(e) removing the water from the fibrous structure whereby the fibrous structure is formed into a filter sheet;
(f) drying said filter sheet;
(g) cutting said filter sheet into a desired size wherein said filter sheet comprises at least about 70% cellulose fibers and at least about 2% cellulose ester fibrils.

20. The method of claim 19 wherein the slurry of cellulose ester fibers in said slurry comprise from about 2% to about 30% of the filter sheet and cellulose fibers comprise from about 98% to about 70% thereof.

21. The method of claim 19 wherein the cellulose ester fibrils in said slurry comprise from about 5% to about 20% of the filter sheet and the cellulose fibers comprise from about 95% to about 80% thereof.

22. The method of claim 19 wherein a dilute aqueous solution of a cationic wet strength resin is mixed with the mixed slurry of cellulose ester fibrils and cellulose fibers.

* * * * *

UNITED STATES PATENT AND TRADEMARK OFFICE
CERTIFICATE OF CORRECTION

PATENT NO. : 5,114,537

DATED : May 19, 1992

INVENTOR(S) : Robert S. Scott and Richard W. Atwood

It is certified that error appears in the above—identified patent and that said Letters Patent is hereby corrected as shown below:

In the Specification:
    Col. 1, line 48, delete "-" at end of line.
    Col. 1, line 51, "1970,s," should read --1970's--.
    Col. 7, line 32, "SB" should read --$S_B$--.
    Col. 9, line 17, "Number" should read --Numbers--.
    Col. 10, Table 1, "7 1/4" should read --7 1/2-- and "12 1/4" should read --12 1/2--.

Col. 11, line 30, "having" should read --have--.

Signed and Sealed this

Twenty-first Day of June, 1994

Attest:

BRUCE LEHMAN

*Attesting Officer*    *Commissioner of Patents and Trademarks*